(12) United States Patent
Dobbins

(10) Patent No.: US 10,607,171 B1
(45) Date of Patent: Mar. 31, 2020

(54) METHOD AND SYSTEM FOR AUTOMATED CROP MANAGEMENT

(71) Applicant: AGRICHEM, Yatala QLD (AU)

(72) Inventor: Michael Robert James Dobbins, Yatala (AU)

(73) Assignee: AGRICHEM, Yatala, QLD (AU)

( * ) Notice: Subject to any disclaimer, the term of this patent is extended or adjusted under 35 U.S.C. 154(b) by 398 days.

(21) Appl. No.: 14/200,476

(22) Filed: Mar. 7, 2014

Related U.S. Application Data

(60) Provisional application No. 61/774,056, filed on Mar. 7, 2013.

(51) Int. Cl.
*G06Q 10/06* (2012.01)
*G06Q 50/02* (2012.01)

(52) U.S. Cl.
CPC . *G06Q 10/06315* (2013.01); *G06Q 10/06312* (2013.01); *G06Q 50/02* (2013.01)

(58) Field of Classification Search
CPC ....... G06Q 10/06315; G06Q 10/06312; G06Q 10/0631; G06Q 50/02
See application file for complete search history.

(56) References Cited

U.S. PATENT DOCUMENTS

| | | | |
|---|---|---|---|
| 7,363,154 B2 | 4/2008 | Lindores | |
| 8,671,006 B2 | 3/2014 | Zyskowski et al. | |
| 8,731,836 B2 | 5/2014 | Lindores et al. | |
| 8,768,667 B2 | 7/2014 | Lindores | |
| 8,855,937 B2 | 10/2014 | Lindores | |
| 8,897,541 B2 | 11/2014 | Weisenburger et al. | |
| 8,942,483 B2 | 1/2015 | Janky et al. | |
| 9,058,633 B2 | 6/2015 | Lindores et al. | |
| 9,060,473 B2 | 6/2015 | Lindores | |
| 9,202,252 B1* | 12/2015 | Smith | G06Q 50/02 |
| 9,408,342 B2 | 8/2016 | Lindores | |
| 9,491,914 B2 | 11/2016 | Lindores | |
| 2006/0025927 A1* | 2/2006 | Hoskinson | A01B 79/005 |
| | | | 702/1 |
| 2006/0030990 A1 | 2/2006 | Anderson et al. | |
| 2007/0260400 A1* | 11/2007 | Morag | G06Q 10/00 |
| | | | 702/1 |
| 2008/0097653 A1* | 4/2008 | Kaprielian | A01C 23/042 |
| | | | 700/284 |
| 2010/0306012 A1* | 12/2010 | Zyskowski | G06Q 10/06 |
| | | | 705/7.36 |
| 2012/0083907 A1 | 4/2012 | Motavalli et al. | |
| 2012/0101861 A1 | 4/2012 | Lindores | |
| 2012/0237083 A1* | 9/2012 | Lange | G06K 9/00805 |
| | | | 382/103 |

(Continued)

OTHER PUBLICATIONS

Kim, Yunseop, Real-time Nitrogen Detection System of Corn Crop Using a Multi-spectral Imaging Sensor (Year: 2002).*

(Continued)

*Primary Examiner* — Charles Guiliano
(74) *Attorney, Agent, or Firm* — Kenner Renner; Arthur M. Reginelli

(57) ABSTRACT

An automated management tool is provided for crop management including the application of all primary agricultural production inputs, including fertilizers, nutrients and other agricultural chemicals, as well as for retrieval and analysis of data pertaining to the site/farm.

11 Claims, 16 Drawing Sheets

(56) References Cited

U.S. PATENT DOCUMENTS

| 2013/0173321 A1* | 7/2013 | Johnson | G06Q 10/06 |
| | | | 705/7.12 |
| 2013/0174040 A1* | 7/2013 | Johnson | G06Q 10/06 |
| | | | 715/733 |
| 2013/0226357 A1* | 8/2013 | Ersavas | A01G 1/00 |
| | | | 700/284 |

OTHER PUBLICATIONS

Tony Proffitt and Rob Bramley, Further developments in Precision Viticulture and the use of spatial formation in Australian vineyards, 15th Romeo Bragato Conference, Napier, Aug. 20-22, 2009, pp. 1-13.

* cited by examiner

METHOD AND SYSTEM FOR AUTOMATED CROP MANAGEMENT

RELATED APPLICATIONS

This application claims the benefit of U.S. Provisional Application Ser. No. 61/774,056, filed on Mar. 7, 2013, which is incorporated herein by reference.

FIELD OF THE INVENTION

One or more embodiments of the present invention provide an automated crop management method for improving the profitability of agricultural crops production. Methods of the invention provide an automated management tool for the management of crops including application of all primary agricultural production inputs including fertilizers, which contain plant nutrients, irrigation and other agricultural chemicals such as pesticides.

BACKGROUND OF THE INVENTION

As farm enterprises increase in size and have multiple crops, multiple soil types, multiple plantings, multiple irrigation requirements, nutrition, pest and disease management, changing weather conditions, sustainable farm economics with quality produce and parameters, variable grading, packaging and transport of produce for the markets and quest for consistency of produce year after year warrants the demand for an automated decision making tool to save growers' time and resources on such management decisions as to what inputs to use, how much to use, when to use and frequency of use, and how to use profitably.

Irrigation of crops and proper nutrient application is critical to optimum plant growth and yield. A fertile soil, i.e. one that contains an adequate supply of all the nutrients required for the successful production of plant life, is important because the full potential of crops may never be realized if a shortage of nutrients occurs at any time during the growth cycle.

The productive capacity and the soils on farms and individual paddocks on a farm can vary widely. Thus, there are no solutions that can be applied across all farms, or even all paddocks. In order to manage this complicated system, growers need to make use of some or all the diagnostic tools that are available. Some of the diagnostic tools that have been employed include soil tests for all nutrients in elemental form, plant tissue tests to detect all elemental deficiencies/toxicities, tissue and Sap tests and near infra-red reflectance (NIR) tests to determine nutrient status. Monitoring can include remote sensing, optical sensors, drones, robots, and satellites, as well as manual observation, and all forms of imagery such as light spectrum, electro-magnetic, radio-isotopic etc., and other sources of data.

Fertilizers and other farm inputs represent a substantial annual expenditure for growers. Applying the inputs at the right time and in the optimal amount can lead to more profitable farming. When cost-savings is important, optimization of the nutrient application is preferable to reducing the number or frequency of applications, which can lead to reduced productivity and profitability. Using too much is costly, wasteful and has potential environmental effects. Using too little makes the yield less productive and consequently less profitable. Improved methods are needed for determining what nutrients are required, the optimal time for applying the nutrients, and the optimal amount of nutrients to be applied, so that yield can be improved. Achieving yield improvement has been difficult, because many factors come into play.

Some of the factors to be considered include the following. To achieve maximum yield, crops require adequate supply of essential plant nutrients. Ideally, the determination of what constitutes an adequate supply should take into account deficiencies/toxicities, inefficiencies in nutrient availability to the plant (due to chemical nature of fertilizers, soil type, plant growth and environmental factors) and nutrient removal by production of the crop. The decision on how much fertilizer or other nutrients to apply is complex, as many factors are outside the farmer's control. Assessment of nutrient availability from the soil (using soil tests), calculation of the nutrients removed in produce (based on target yield of crop to be grown), and the gathering of local trial data and experience are some of the factors that should be employed to determine a fertilizer application rate. Both external factors and factors that are inherent in the plants will have an influence on the rate of active nutrient absorption. The rate of nutrient absorption can be influenced by the growth stage of the plants, the crop type and variety, the type of nutrient, the climate and the soil Computer simulation models may be available that can accept information from soil tests, local trial data, research and experience to generate the optimal application rates. However, even once the correct application rates have been established, placement and timing of application must be considered. External factors including weather can have an important affect on nutrient requirements and effectiveness. Temperature (metabolic rate), light (photosynthesis and bio-mass production), oxygen, respiration and metabolic rate, and carbon dioxide concentration should be taken into account, and factored into application recommendations, along with consideration of the pH of the soil, concentration of solutes in soil solution and interactions between ions.

For example, if weather forecasters are predicting a hotter than normal season, a grower may wish to apply products with stress relief and/or cell strengthening features, such as one or more of the following products that are commercially available from Agrichem: Stand SKH™ (a NPK 0-0-15 product also containing 20% silica and 1% humic acid), Enhance KCS™ (NPK 2-0-5, 7% Ca 4.1% S 11% Si), and Kelpak™ (a product containing 11 mg/L auxins, 0.031 mg/L cytokinins), and a mixture of these products in certain concentrations help plants to overcome heat effects, and/or Supa Humus™ (NPK 0-0-2 with 26% humic acid), to enhance the water retention properties of soil.

The failure to consider all factors can lead to inefficiencies. Proper consideration of all factors can reduce the error and improve efficiency of a wide range of nutrients and other agricultural chemicals. Proper consideration of all factors can also result in increased yield.

Thus, a method for automatically collecting and compiling data related to all relevant factors and generating optimal application recommendations based upon all of these factors would be desirable. Additionally desirable, would be a method for automatically scheduling input application tasks, generating instructions for implementation of the tasks, and confirming that the tasks have been completed. Desirably, the amount of human error could be reduced, labor and management costs could be reduced, yield could be maximized and therefore profitability could be maximized.

SUMMARY OF THE INVENTION

Embodiments of the invention provide an automated crop management method, the method comprising the steps of:

providing a storage memory and a computer processor in communication with the storage memory; collecting, in the storage memory, prospect information, including property characteristics and crop production goals relative to the new prospect; collecting, in the storage memory, irrigation information, including irrigation equipment and procedures relative to the prospect; creating, using the processor, a recommended input tasks program that correlates the collected prospect information and collected irrigation information, and that includes one or more recommended nutrient application tasks, and a schedule for completing said recommended nutrient application tasks; communicating said recommended input tasks program to said prospect, who upon approval of said program becomes a user; preparing to implement the recommended input tasks program; issuing instructions to said user for implementing the recommended input tasks program; implementing said recommended input tasks, according to said schedule, or directing the user's implementation of said recommended input tasks according to said schedule; and confirming that all of said recommended input tasks are completed according to said schedule. As will be described in greater detail herein, the recommended tasks or task program may include information relative to nutrient application, irrigation, and pest control.

DETAILED DESCRIPTION OF ILLUSTRATIVE EMBODIMENTS

Figure 1:
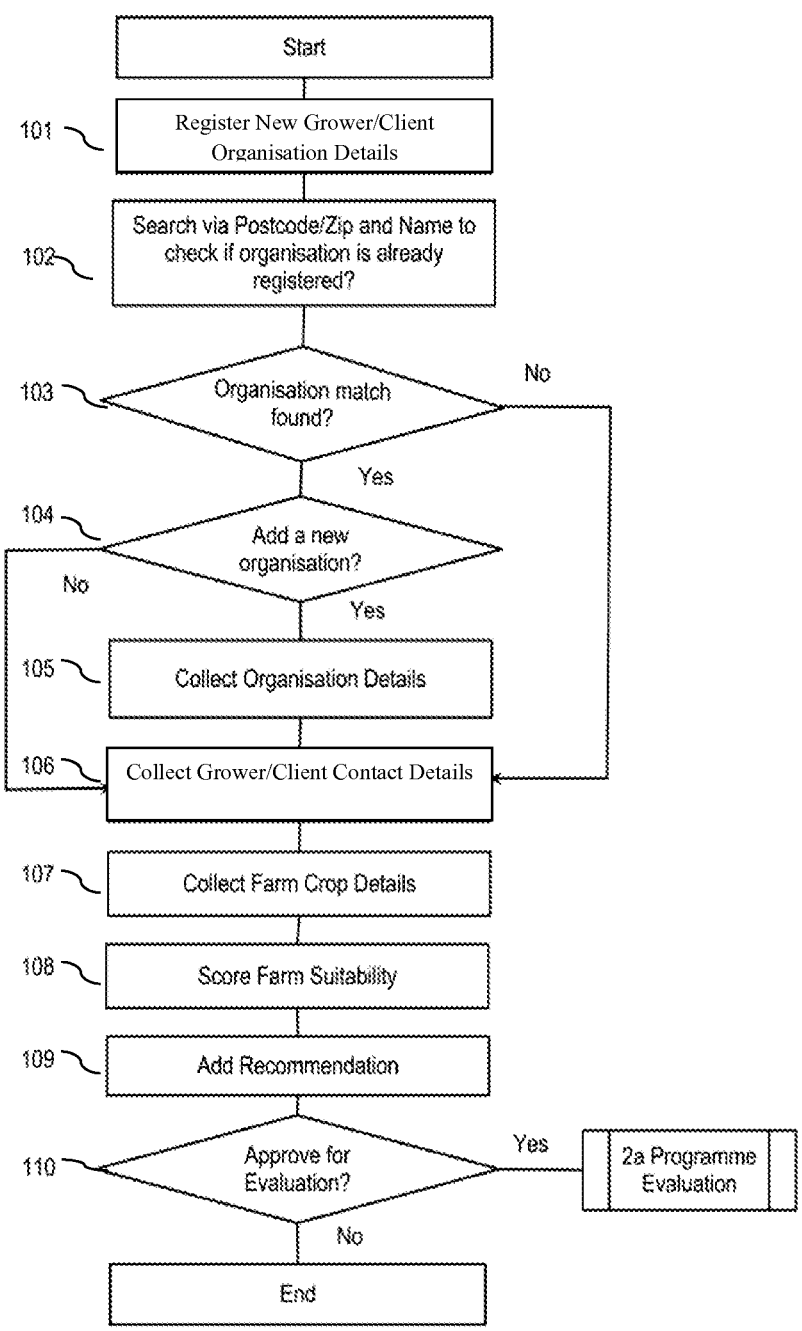
FIG. 1 illustrates a method for registering a new prospect for an automated nutrient application program according to one embodiment of the invention.

Embodiments of the present invention provide a crop management method and/or system that includes an automated process for primary production inputs, which may also be referred to as input tasks, input requirements, recommended inputs, or simply inputs. Primary production inputs include fertilizers (i.e. nutrients), water, and other agricultural chemicals and resources such as pesticides. The primary production inputs can be defined based upon the type of product (whether fertilizer, pesticide, other), amount of product, the correct time of application (time of year/growth stage of the plant), and the method by which it is applied. In one or more embodiments, the method and system of the present invention automatically provides a grower with detailed instruction, which may be in the form of reports, or which may be referred to as an input program, on all aspects of the primary production inputs. For example, the method and system may advantageously provide a grower with instruction as to what fertilizer and/or pesticide to apply, how much to apply, when to apply it; the same instruction can be provide with respect to water. Ultimately, the methods of the invention include implementation of the recommended inputs by the grower. Where implementation does not occur according to the plan, the system and/or methods includes automatic alerts to ensure that implementation ultimately occurs. Additionally, the system and method manages the period before the crop is grown (pre-season), which advantageously addresses many important issues such as how much area to plant and projected costs, as well the period after the crop is completed (post-season), which advantageously addresses issues such as performance, input use, and economic analyses. Still further, the system and method of the invention can automatically provide the grower with a host of information relative the primary production inputs, such as, but not limited to, the total application of each key element (e.g. N, K, P, S, etc.) applied to a given area in a given time frame. Advantageously, the crop management method and system of the present invention integrates and collectively manages crop nutrition, irrigation, pest control, and farm productivity and profitability; in these or other embodiments, the system and method also facilitates various regulatory reporting required of the grower.

The automated decision-making process has application for many types of agricultural crops, including broadacre, cotton, row crops, horticulture, silviculture, viticulture, and field and controlled environment hydroponics crops. Embodiments of the invention provide improved yield, and therefore improved profitability for the grower.

In one or more embodiments, data collected according to the steps of the invention may be electronically stored using an electronic storage device, as will be described in greater detail below. Information generated using, at least in part, the collected data, may be automatically generated by using electronic processing equipment, such as a central processing unit, as will be described in greater detail below. The practice of one or more embodiments of this invention is not limited by the devices used to store or automatically generate the information. The skilled person will also understand that information is automatically generated using electronic processing equipment operating based upon a predetermined set of factors, data manipulations, and/or calculations, which may be generally referred to as algorithms. Embodiments of the invention are likewise not necessarily limited to any particular algorithm employed with it being understood that the skilled person can, without undue experimentation or calculation, devise algorithms to provide useful information for practicing the invention herein once armed with the teachings provided herein.

In one or more embodiments, an automated system may be employed that may include a computer and/or another type of electronic device having a storage memory and a processor. Processors include central processing units (CPU) and/or other processing circuitry (e.g. digital signal processor (DSP), microprocessor, etc.). It should be understood that the term processor may refer to more than one processing device, and that various elements associate with a processing device may be shared by other processing devices. The term "storage memory" includes memory and other computer-readable storage media, flash memory, etc. The automated system may further include one or more input devices (e.g. keyboard, mouse, etc.) for entering data and collecting data in the storage memory, and/or one or more output devices (e.g. printer, monitor, etc. . . . ) associated with the processor for communicating instructions and results.

The storage memory may include a database. In one or more embodiments, the database contains a structured collection of data related to the attributes of nutrient application that can contribute to increased yield. Advantageously, the automated system is designed to support increased yield.

The automated system may be adapted to allow access to the Internet, and may be further adapted to be accessed via the Internet.

In one or more embodiments, the automated decision-making process may be referred to as an automated nutrient application method, or simply as an automated method, and may include the steps of identifying and registering a new prospect for the program, collecting prospect information, collecting irrigation information, creating a recommended nutrient program, preparing to implement the nutrient application, issuing instructions for implementing nutrient application tasks, optionally updating the instructions based upon one or more of weather, field device data, or laboratory reports, implementing nutrient application tasks, confirming the nutrient application tasks are completed, and evaluating the results. Advantageously, unfinished tasks may be quickly identified and reported to senior management personnel.

Embodiments of each of these and other steps are illustrated in the Figures and are discussed below.

I. FIG. 1

In one or more embodiments, a farm owner who is interested in the automated nutrient application program, i.e. a prospect or trial organization, submits his property for evaluation, and the farm property is evaluated for eligibility for the program.

The process of registering a new prospect for the automated nutrient application program 100 is generally illustrated in FIG. 1. In one or more embodiments, information is collected and input into the database of the automated system, a rating scale is applied, and an eligibility score is generated.

More specifically, in one or more embodiments, the process of registering a new prospect includes the steps of gathering information about the organization, including name and address, contact information, and farm crop details; scoring the suitability of the organization for the automated method; formulating a preliminary recommendation based upon the score; and approving the organization for registration or rejecting the organization. In certain embodiments, information is also gathered related to profitability, management practices, and on-farm practices.

In one or more embodiments, information may be gathered related to the new trial organization's name and its postcode/zip 101, and cross-referencing the organization name and address in order to determine if the organization is already registered 102. A determination may then be made as to whether or not a matching organization is found in the database 103.

In one or more embodiments, if no organization is found with a matching name or postcode/zip, new organization details may be collected and added to the database 105.

In one or more embodiments, where an organization is found with either a matching name or postcode, a determination is made 104 to either use the found organization and move on to collecting trial contact information 106, or to add a new organization to the database 105.

In one or more embodiments, when a new organization is added, relevant details including farm physical address, postcode/zip and farm manager contacts are added, prior to collecting trial contact information.

In one or more embodiments, once an organization is in the database, additional contact information is collected relevant to the specific nutrient application program, including contact details for specific staff that are in charge of spray machinery, irrigation, harvesting, monitoring, and crop grading 106. Information regarding equipment, irrigation methods, water scheduling, and spray programs may be collected.

In one or more embodiments, details are collected on each crop that is grown at the prospect farm, including the type of crop and area that is farmed 107. Additional details regarding soil, water (pH), climate, and crop variety may also be collected. Tissue tests and/or sap tests may be done. Past farm performance in terms of yield, quality and pack outs may be collected. Soil sample information may provide an understanding of the physical, biological and chemical properties of the soil.

In step 108, a rating is assigned for each of a plurality of criteria, and a score is generated for the new trial organization. In one or more embodiments, the score indicates the suitability of the organization for an automated nutrient application program. In one or more embodiments, the rating scale is a scale of from 1 to 5, and the score represents the overall average of the ratings for each criteria.

The criteria may include, without limitation, the size of the farm operation, the irrigation infrastructure, the organization's use of data-based decision-making, membership on agricultural boards, the organization's status in the community, financial stability of the organization, and its use of technology in agriculture.

In one or more embodiments, a recommendation is prepared based upon the ratings and score, regarding why the organization should or should not be registered for an automated nutrient application program 109.

In step 110, a review may be undertaken of the collected prospect information, and a decision is made to register the prospect for evaluation 2a or to reject the prospect.

Figure 2A:
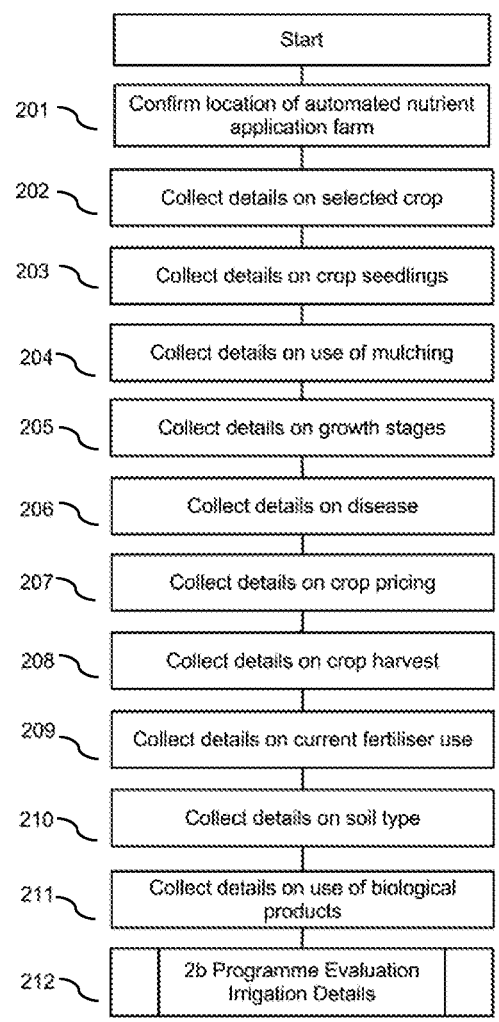
FIG. 2a illustrates a method for collecting background information according to one embodiment of the invention.

II. FIG. 2a

The process of collecting required background information 200 is generally illustrated in FIG. 2a. In one or more embodiments, background information includes information about the location of the prospect farm, the selected crop, the seedlings, the use of mulching, the growth stage, disease, crop pricing, current and desired crop harvest, the use of fertilizer, soil type, and the use of biological products.

In one or more embodiments, the step of collecting information on the prospect farm 201 may include collecting details on the exact location of the automated nutrient application farm, including the shipping address. Geolocation details of longitude and latitude are automatically calculated, or may be manually entered.

In one or more embodiments, the step of collecting information on the crop 202 may include collecting details about the crop type and variety, confirmation of crop area, and details on the spacing between crops in each row and between rows. Further information may be collected regarding the market destination for the crop and the projected date of planting.

In one or more embodiments, the step of collecting information on the crop seedlings 203 may include collecting details on if the seed is treated, and if so, what seed treatment products have been applied. If the seeds were obtained from a nursery, the name and address of the nursery may be collected.

In one or more embodiments, the step of collecting information on the mulching practices 204 may include collecting information about the nature and amount of mulching that is employed.

In one or more embodiments, the step of collecting details of crop growth 205 may include collecting details regarding the estimated days until first flowering, days to first pick, the number of harvests, and estimated plant population per hectare.

In one or more embodiments, the method includes the step of collecting details of any current pests or diseases affecting the crop 206.

In one or more embodiments, the method includes the step of collecting details of estimated pricing for premium grades and secondary grades of the crop 207.

In one or more embodiments, the step of collecting details on crop harvest 208 may include collecting details including the current yield of the crop produced on the prospect program area, and/or the organization's desired yield, the current pack out of the crop and/or the desired pack out. Information about factors that may be currently affecting yield and pack out may also be collected.

In one or more embodiments, the method includes the step of collecting details on the current application of nutrients on the prospect area 209, including fertigation and spray products used, and the cost per hectare of the current nutrient application.

In one or more embodiments, the step of collecting details on soil type 210, may include collecting details on the soil classification in the prospect area. Systems such as the USDA soil taxonomy or the Australian Soil Classification may be employed. The soil type may have multiple soil horizons, each soil horizon being a layer parallel to the soil surface, whose physical characteristics differ from the layers above and beneath. The physical characteristics may include color, texture, and particle size distribution. Composition and depth of each layer, for example the A horizon, the B horizon, and so on, may be collected. Further information on current soil issues, such as sodium or chloride problems may also be collected.

If the prospect currently uses any biological products, this information may be collected 211, including the type and brand of the products. In one or more embodiments, information is collected on the use of compost teas, organic products, and biological products such as bacteria and fungi. In one or more embodiments, once the background information is completed 212, the process of collecting irrigation details is initiated.

Figure 2B:
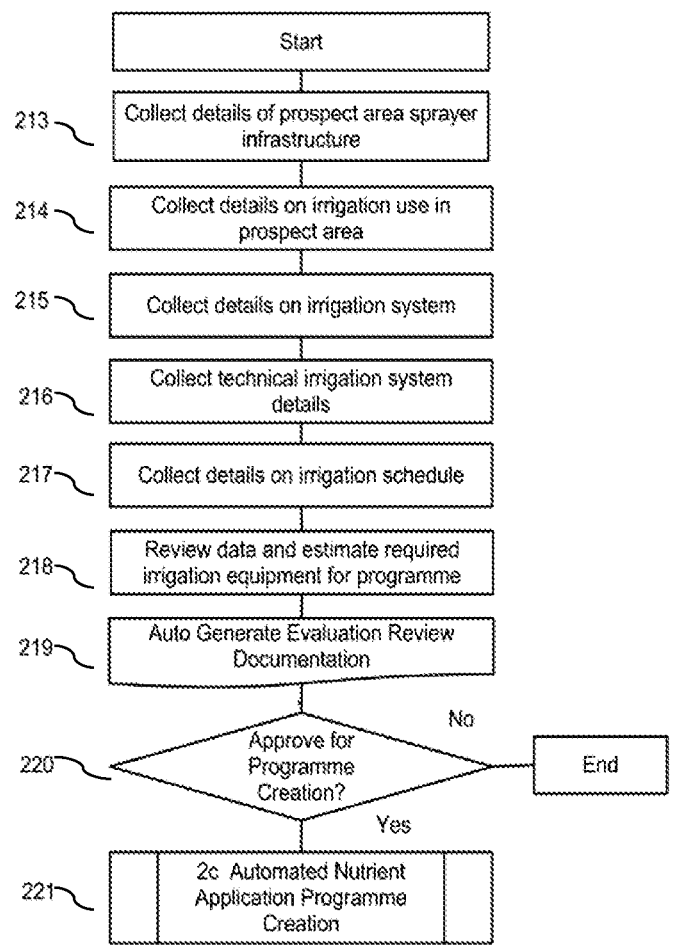
FIG. 2b illustrates a method for collecting irrigation information according to one embodiment of the invention.

III. FIG. 2b

The process of collecting irrigation information, reviewing the collected information and generating recommendations and approval 212 is generally illustrated in FIG. 2b.

In one or more embodiments, the irrigation information includes information on area sprayer infrastructure, irrigation infrastructure, the type of irrigation used, the technical specifications of the irrigation system, and the schedule of irrigation.

In one or more embodiments, the step of collecting information on the sprayer infrastructure 213 includes collecting information about the type of sprayer, sprayer volume, spray volume per hectare, and water source. In one or more embodiments, information about any pesticides that are used may be included with the sprayer infrastructure information.

In one or more embodiments, the step of collecting information on the irrigation infrastructure 214 includes collecting information about the irrigation company used, the type of water/nutrient delivery system and type of distribution, the flow rate per hour, and the frequency of application.

In one or more embodiments, the step of collecting information on the details of the irrigation system 215 includes collecting information about whether central pivot, drip, flood, under tree sprinkler or overhead sprinkler are included in the irrigation system.

In one or more embodiments, the step of collecting technical information on the irrigation system 216 includes collecting details about any fertigation injection system that is employed, pressure differential tanks, water pressure, pressure reduction valves and filtration systems.

In one or more embodiments, the step of collecting information on the scheduling of irrigation 217 includes collecting information about standard irrigation shifts, maximum shift, scheduling at different crop stages, and any monitoring devices currently used.

In one or more embodiments, the collected irrigation data is reviewed 218, and an estimate is generated for any additional irrigation equipment that is required in order to enable the automated nutrient application program.

In one or more embodiments, a summary document is generated 219 that reviews all of the information gathered in processes 213-217.

In step 220, following a review of the collected information by the provider of the automated program, an approval decision is made to either proceed to creating an automated nutrient application program (step 221) or to end the prospect's application. If approved, the prospect becomes a user. For purposes of this specification, the user may also be referred to as a client.

Figure 2C:
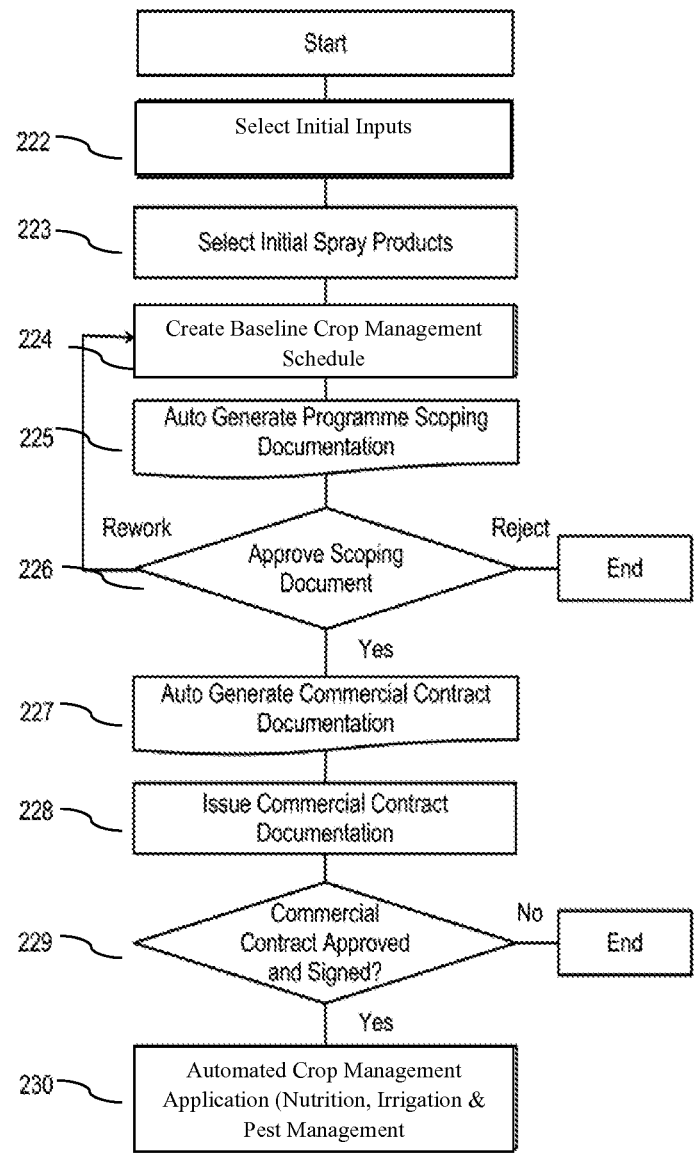
FIG. 2c illustrates a method for recommending and obtaining approval of a preliminary automated nutrient application program according to one embodiment of the invention.

IV. FIG. 2c

A method for recommending and obtaining approval of an automated crop management program 221 (which as suggested above may include nutrient information, irrigation requirements, pest control etc. . . . ) is generally illustrated in FIG. 2c. In one or more embodiments, the method includes selecting products, preparing a baseline application recommendation, obtaining approval of the recommendation or, if necessary, revising the recommendation and obtaining approval of the revised recommendation, incorporating the approved recommendation into a commercial contract, and obtaining approval and signature for the commercial contract.

In one or more embodiments, the process of selecting products includes selecting initial inputs (e.g. fertigation products) 222 and selecting initial spray products 223. Specific elemental nutrients may be selected for each growth stage, for both fertigation and foliar application. Selection may also be dependent upon the soil type, climatic region, and the desired yield.

Initial inputs may include nutrients such as fertilizers, soil amendments, pesticides, herbicides, fungicides, and other water-soluble nutrients, as well as irrigation requirements. Examples of nutrients include, without limitation, nitrogen, nitrate, ammonium, urea, phosphate, and potassium. In one or more embodiments, the initial fertigation products include one or more liquid fertilizers.

Selection of initial inputs 222 may be based upon factors including the crop type selection, past historical performance data for the crop type, the climate conditions of the crop area, identified deficiencies in the soil, pest and disease, and the desired improvements for the crop in terms of yield and quality.

In one or more embodiments, initial spray products may include nutrients such as fertilizers, soil amendments, pesticides, herbicides, fungicides, natural growth promoters and other water-soluble nutrient inputs. Examples of nutrients include, without limitation, nitrogen, nitrate, ammonium, urea, phosphate, potassium and micronutrients (sulphur, calcium, magnesium, sodium, zinc, iron, manganese, copper, boron, molybdenum, cobalt, silica, humates, chlorides and selenium). In one or more embodiments, the initial fertigation products include nitrogen, phosphorus, potassium, sulphur, calcium, magnesium, sodium, zinc, iron, manganese, copper, boron, molybdenum, cobalt, silica, humates, chlorides and selenium, pH adjusters, and mixtures thereof.

Selection of initial spray products 223 may be based upon factors including the crop type selection, past historical performance data for the crop type, the climate conditions of the crop area, adverse environmental conditions, identified deficiencies/toxicities in the soil and tissue test, pest and disease, and the desired improvements for the crop in terms of yield and quality.

Once the initial inputs and spray products are selected, a recommended baseline application schedule is prepared 224. In one or more embodiments, the baseline schedule of application for the selected inputs and spray products includes the lifespan of the crop growth stages, from nursery and pre-planting, through to flowering and harvesting.

In one or more embodiments, the recommended application schedule for initial inputs and spray products is compiled and a scoping document is automatically generated 225. In one or more embodiments, the scoping document also include projected yield, pack outs, product information and costing for the initial inputs and spray products, the required infrastructure, and a projected return on investment.

In one or more embodiments, the scoping document is forwarded to the client for approval or a meeting is held between the provider of the automated program and the client to review the scoping document 226. If the scoping document is completely rejected, the process of generating an automated program is terminated.

In one or more embodiments, if the scoping document is partially rejected the scoping document is reworked and the application schedule is modified. A new scoping document is automatically generated, and another review is held.

If the scoping document is approved, commercial contract documentation is automatically generated 227. In one or more embodiments, the commercial contract documentation is based upon the products, schedule and costs outlined in the scoping documents.

In one or more embodiments, the commercial document is submitted to the client for approval and signature 228. If the commercial document is approved, the program moves on to implementation of the automated program application (step 230). If the commercial document is rejected, the process is terminated.

In one or more embodiments, approval of the commercial document triggers the generation of recommended input tasks. These input tasks are automatically generated by using an electronic computing device operating based upon a predetermined set of factors, data manipulations, and/or calculations (i.e. algorithms) to automatically generate the input tasks in view of one or more of the data collected. These algorithms may additionally employ data or constants developed from observations and/or the collection of data from other sources besides the farm in question; these other sources may data or constants developed from observations and/or collection of data from controlled experiments, similarly situations farms, prior published studies and standards, and the like.

Figure 3A:
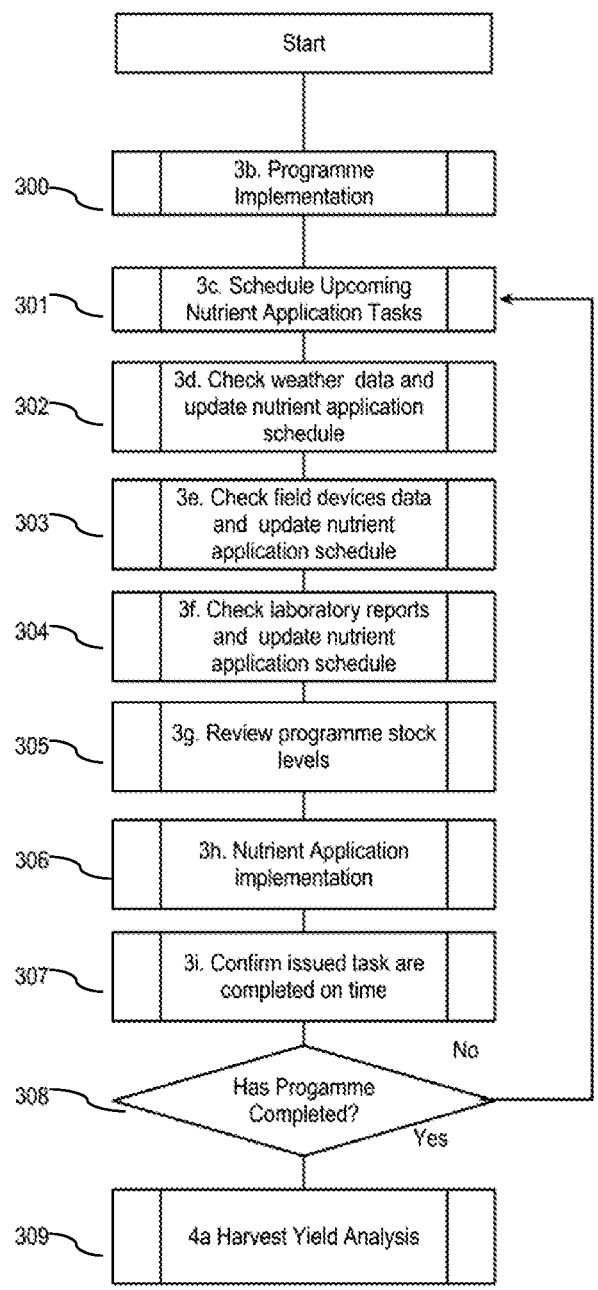
FIG. 3a illustrates a method for overall implementation of an automated nutrient application program according to one embodiment of the invention.

V. FIG. 3a

The process of implementation of the automated program application is generally illustrated in FIG. 3a. In one or more embodiments, the implementation process 230 includes initial preparation for implementation 300 (ordering and installing necessary equipment and ordering and delivering necessary products to the client farm); issuing instructions 301; monitoring weather data and optionally updating the instructions 302; monitoring field device data and optionally updating the instructions 303; monitoring laboratory data and optionally updating the instructions 304; monitoring and ordering product stock 305; applying or undertaking the recommended inputs such as applying nutrients 306; and confirming scheduled tasks are completed 307. If confirmation of the completion of all scheduled tasks is obtained 308, then a harvest yield analysis may be initiated 309. Advantageously, additional data input, such laboratory information relative to plant nutrient 304, can coincide with automated processes that, according one or more algorithms, modify the recommended inputs.

Figure 3B:
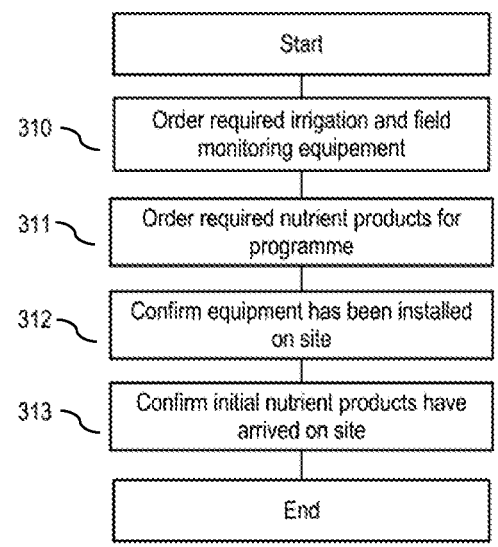
FIG. 3b illustrates a method for preparing to implement the automated nutrient application program according to one embodiment of the invention.

VI. FIG. 3b

In one or more embodiments, initial preparation for implementation 300 may include installation of selected agricultural and technical equipment at the crop location and the order and delivery of an initial supply of selected nutrient products. The initial preparation for implementation process is generally illustrated in FIG. 3b.

In one or more embodiments, an order is placed for the selected and approved irrigation equipment for the program, and also any additional field monitoring devices such as soil monitors and weather stations 310. In one or more embodiments, an automated analysis of the initial supply of program product stock that is required for a pre-defined period of time is made, and delivery is received at the location of the crop, i.e. the client's farm 311. The selected irrigation and field monitoring equipment may be installed onsite, with connectivity made to the automating system 312. In one or more embodiments, confirmation that the selected equipment and monitoring devices are installed 312, and that the necessary products are on hand 313, initiates the next phase of the process, namely issuing instructions.

Figure 3C:
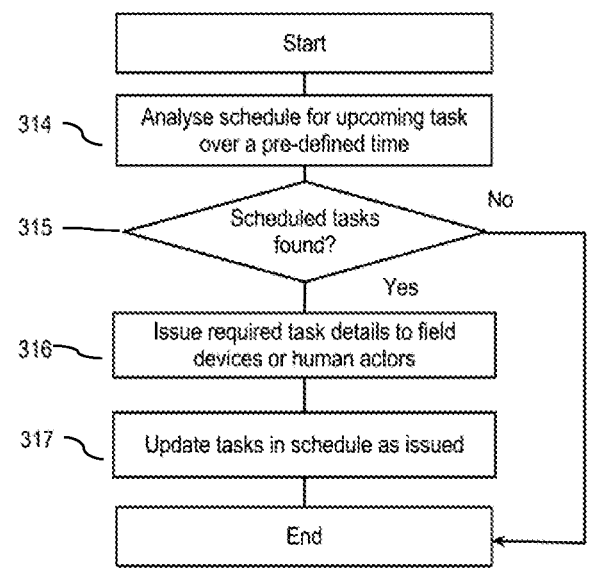
FIG. 3c illustrates a method for scheduling upcoming nutrient application tasks and issuing instructions for automated nutrient application tasks according to one embodiment of the invention.

VII. FIG. 3c

In one or more embodiments, issuing instructions 301 includes scheduling upcoming program application tasks. This process is generally illustrated in FIG. 3c.

In one or more embodiments, the process of scheduling upcoming program application tasks includes identifying one or more tasks that are scheduled to be completed within a predefined time frame, confirming that said one or more scheduled tasks have not been completed, generating instructions for completing said scheduled tasks, issuing said instructions to a human actor responsible for completing said task, or to automated field equipment responsible for completing said task, and recording that said instructions have been issued.

In one or more embodiments, the process of scheduling upcoming program application tasks includes analyzing the automated program analysis for any unissued scheduled tasks within a predefined time scale 314, and determining if any scheduled tasks are found 315. In one or more embodiments, program application tasks nutrient application, irrigation, crop measurement, and sample collection.

If a nutrient application task is found scheduled within the predefined timescale, the tasks are issued 316, or if no tasks are found the process ends.

In one or more embodiments, the required instruction for each program application task that is found within the predefined timescale is issued to the automated field equipment responsible for the task, or to a human actor 316. In one or more embodiments, instructions include nutrient application product type, amount and irrigation details, crop measurement requests, or laboratory sample collection requests.

In step 317, the program schedule may be updated, noting each task that has been issued.

Figure 3D:
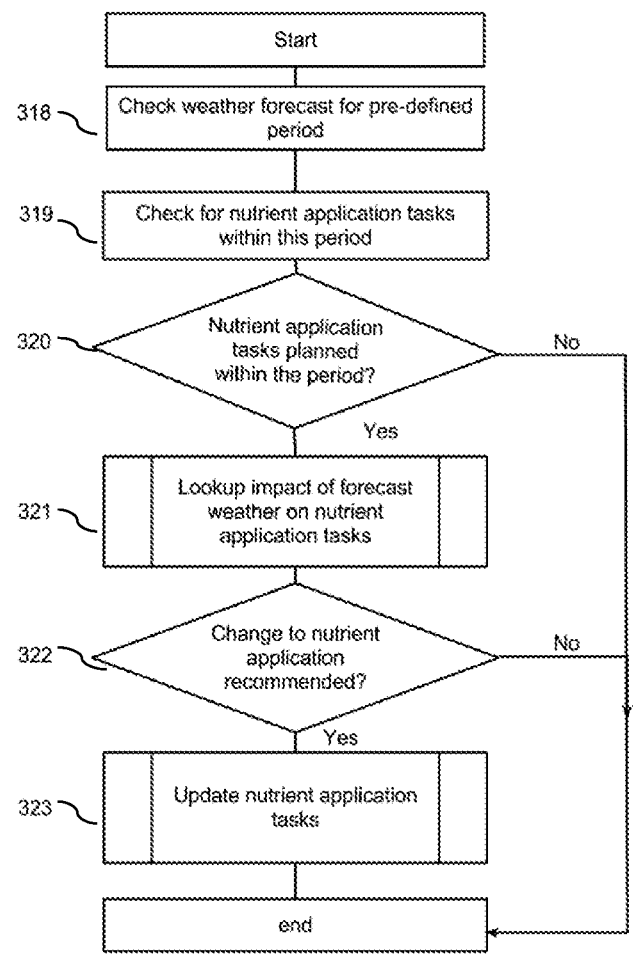
FIG. 3d illustrates a method for optionally updating nutrient application task instructions based upon weather forecast according to one embodiment of the invention.

VIII. FIG. 3d

In one or more embodiments, monitoring weather data and optionally updating the instructions 302 may include performing a weather check, cross-referencing the weather forecast with any scheduled tasks, evaluating the impact of the weather forecast on the scheduled tasks, and optionally generating and issuing updated instructions. This process is generally illustrated in FIG. 3d.

In one or more embodiments, a weather forecast check is performed for the required area in which program application tasks are to be performed 318. The weather check may be an automated activity, and may be gathered from a number of different weather forecast services. The time period for the forecast may vary, but typically may include a 5 day forecast, A variety of weather attributes which may impact crop yield and fertigation application are collected including, but not limited to, minimum and maximum temperature, radiation, cloud cover, precipitation, evapotranspiration and wind speed.

In one or more embodiments, the weather check is cross-referenced to any planned program application tasks for the time period of the forecast 319.

If it is determined that there are no planned program application tasks within the time period of the forecast 320, the process ends as no further work is required.

In embodiments where program application tasks are found within the time period of the forecast, the impact of the forecast on the scheduled tasks is evaluated 321. In one or more embodiments, the evaluation includes recording a value for each weather attribute that is forecast for the date of the scheduled task, accessing stored impact analysis rules, performing calculations, and generating recommendations on any changes that should be made to the scheduled task.

In one or more embodiments, a decision is made 322 to update the instructions 323 or end the process. In updating the instructions 323, updated instructions may be issued to the required field device or human actor.

Figure 3E:
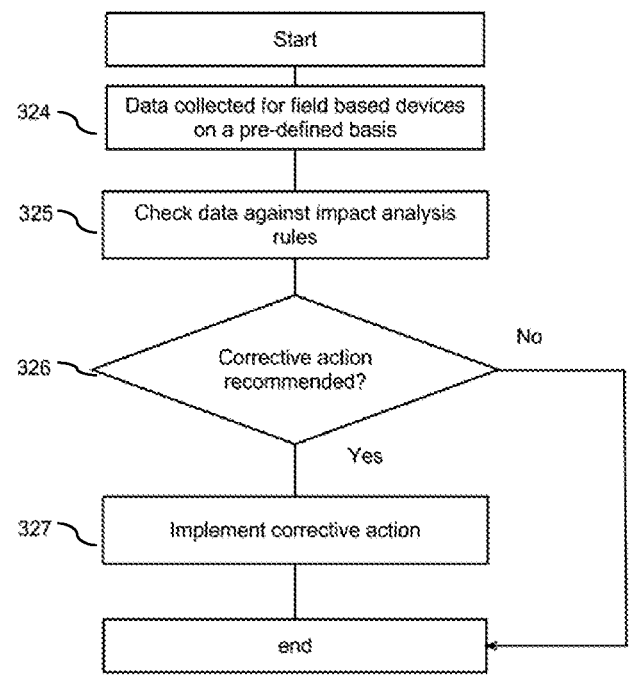
FIG. 3e illustrates a method for optionally updating nutrient application task instructions based upon data received for field devices according to one embodiment of the invention.

IX. FIG. 3e

In one or more embodiments, monitoring field device data and optionally updating the instructions 303 includes receiving data from one or more field devices, determining tasks that are scheduled for completion within a predefined period of time, evaluating the impact of the field device data on the scheduled tasks, based upon stored impact analysis rules, and optionally generating and issuing updated instructions. This process is generally illustrated in FIG. 3e.

In one or more embodiments, data is received from field based devices including soil monitors and weather stations on a pre-defined basis 324. The data may be received on a regularly-scheduled sampling basis, or on a continuous basis. The field based devices may provide any of a variety of attributes that potentially impact crop yield and/or nutrient application, including, but not limited to, soil electrical conductivity (EC) data, soil moisture, actual rainfall, and temperature and irrigation levels.

In one or more embodiments, the impact of the field device data is evaluated 325. In one or more embodiments, the evaluation includes recording a value for each data attribute received from the field based devices, accessing stored impact analysis rules for each attribute, performing calculations, and generating recommendations on any changes that should be made to the instructions.

If it is determined that no corrective course of action is required 326, the process ends. If changes to the instructions are recommended, updated instructions are generated and issued 327. This may be to update a scheduled nutrient application task by applying transformative rules against currently scheduled tasks attributes including, but not limited to, products, product amounts or date. In one or more embodiments, the updated instructions may include the automatic generation on a new nutrient application task.

Figure 3F:
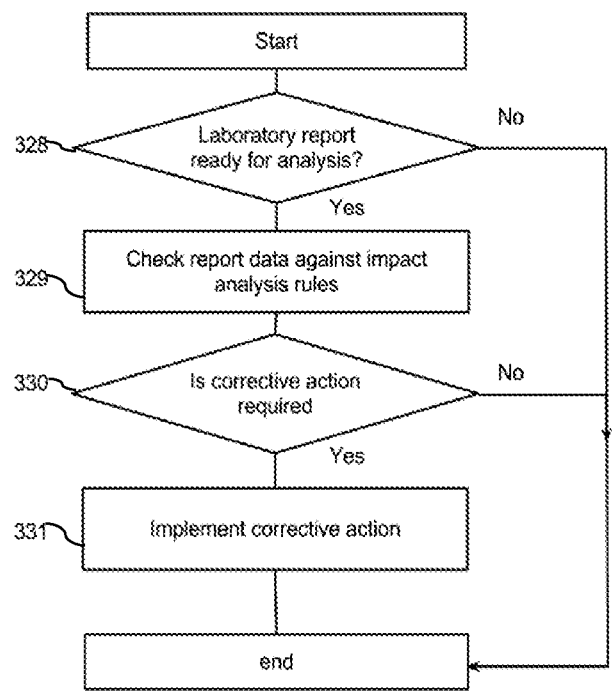
FIG. 3f illustrates a method for optionally updating nutrient application task instructions based upon data received from laboratory reports according to one embodiment of the invention.

X. FIG. 3f

In one or more embodiments, monitoring laboratory data and optionally updating the instructions 304 includes receiving laboratory data, cross-referencing the laboratory data with tasks that are scheduled for completion within a predefined period of time, evaluating the impact of the laboratory data on the scheduled tasks, and optionally generating and issuing updated instructions. This process is generally illustrated in FIG. 3f.

A determination is made as to whether or not laboratory report data has been received and is awaiting review 328. In one or more embodiments, laboratory report data may include data on the amount of any or all of the nutrients present at the time of sampling. The laboratory report data may be received on an adhoc basis, following the completion of the sample collection task 3b. If no laboratory report data is awaiting review, the process completes.

If laboratory report data has been received and is awaiting review, the data may be reviewed against predefined, stored impact analysis rules 329. In one or more embodiments, stored values that comport with recommended nutrient amounts for optimum crop outcomes are accessed, and the amount of one or more nutrients present at the time of sampling is cross-referenced against these stored values.

Where a difference that warrants corrective action is determined 330, recommendations for corrective action are generated and updated instructions are issued 331. The updated instructions may update a scheduled nutrient application task by applying transformative rules against currently scheduled tasks attributes including, but not limited to, products, product amounts or date. In one or more embodiments, the updated instructions may include the automatic generation on a new nutrient application task. If no corrective action is recommended the process ends.

Figure 3G:
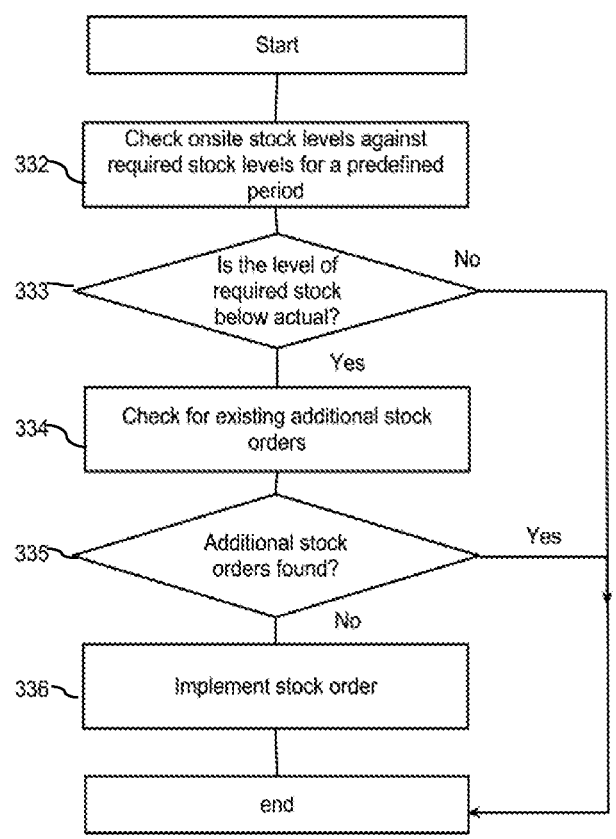
FIG. 3g illustrates a method for optionally automating stock ordering/production and delivery according to one embodiment of the invention.

XI. FIG. 3g

Optionally, the method of the present invention includes a process for automatically monitoring product stock and ordering/producing the stock as needed 305. In one or more embodiments, monitoring and ordering product stock 305 includes checking the actual amount of product at the client location, calculating the amount of product required for a predefined period of time 332, comparing the actual amount to the required amount 333, checking existing orders 334, and generating an order for additional product if necessary 336. This process is generally illustrated in FIG. 3g.

In one or more embodiments, the step of checking and recording the actual amount of product at the client location further includes the step of automatically adjusting the recorded amount of product in correspondence with each nutrient application. The required amount of stock is calculated for a predefined period of time. In one or more embodiments, the predefined period of time is approximately equal to the amount of time required to order/produce and deliver stock to the client's location.

If it is determined that the amount of actual product stock is above the required amount 333, the process completes.

If it is determined that the amount of actual product stock is less than the required amount, an automated check may be performed to determine if a product stock request is pending 335. If an order is pending, and is being processed, the process exits. In one or more embodiments, if an order is pending, but not yet being processed, an escalation may be ordered. If it is determined that no existing stock request exists, a product stock order may be automatically generated.

Figure 3H:
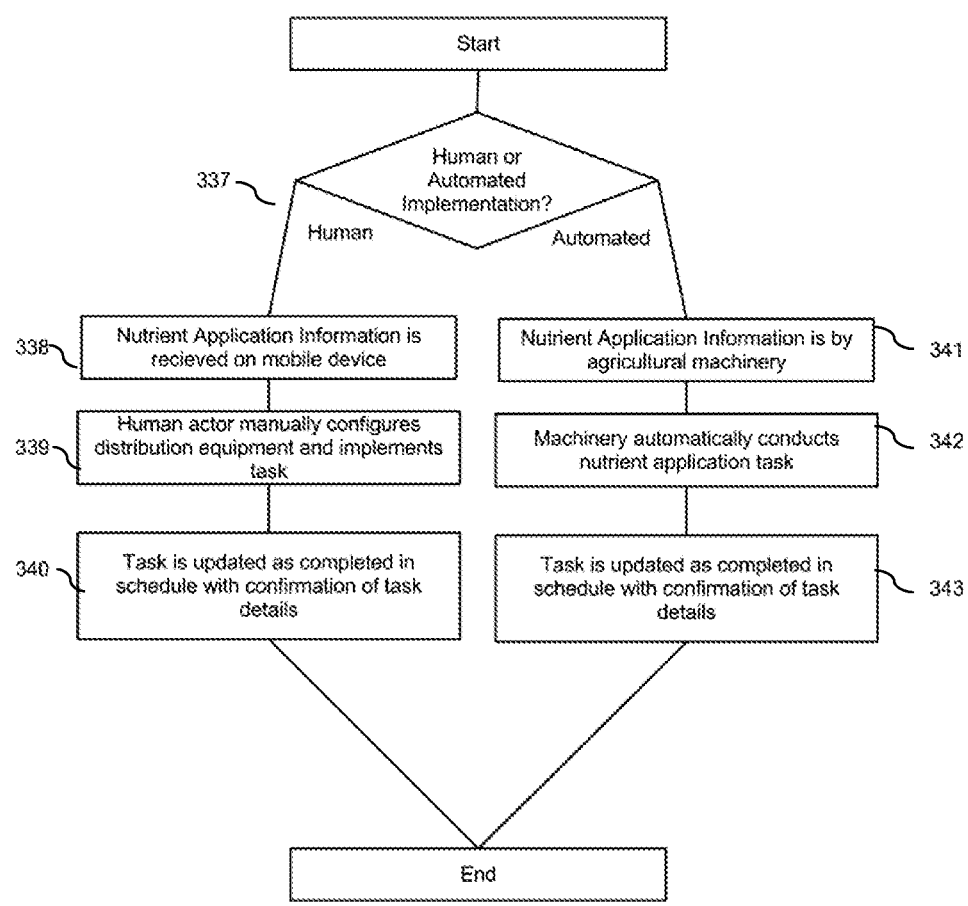
FIG. 3h illustrates a method for implementing nutrient application tasks according to one embodiment of the invention.

XII. FIG. 3h

As described above, nutrient application tasks are automatically scheduled, and instructions are automatically issued for scheduled nutrient application tasks. Nutrient application tasks may be carried out by a field device, i.e. automatically, or by a human, i.e. manually. The process of carrying out nutrient application tasks is generally illustrated in FIG. 3h. In one or more embodiments, the process of carrying out nutrient application tasks 306 includes determining whether the process is to be carried out automatically or manually 337, conveying the nutrient application information to the human or device 338, 341, manipulating equipment/machinery to perform the task 339, 342, and confirming the task as completed 340, 343.

In one or more embodiments, the issued instructions include a schedule, and the schedule includes at least one nutrient application task that is to be implemented on a predefined date according to the schedule. Depending upon the nature of the task, the automated system makes a determination 337, and may generate instructions that recommend that the task may be implemented by a human actor. In one or more embodiments, the human performs the task by operating one or more machines or devices. In one or more embodiments, the instructions may recommend that the task is carried out by automated agricultural machinery.

In embodiments where a task is to be implemented by a human actor, the instruction may be issued to a mobile computing device and received by the human actor 338. In one or more embodiments and as described above, the instruction may include relevant attributes such as what products are to be applied, and irrigation water amounts.

Upon receiving the instructions, the human actor may configure and operate any machinery or equipment as required for the task to be implemented 339.

Upon completion of the task, the human actor confirms that the task is complete. In one or more embodiments, the human actor may report the completion of the task via the mobile computing device, enter confirmation information into a computer or other electronic device, or otherwise update the records of the automated system. In one or more embodiments, additional information of any variance between the task issued and the task as completed may also be entered or reported.

In one or more embodiments, tasks that are not completed within a specific time frame according to the schedule are identified and reported to a line manager or supervisor.

In embodiments where the task is to be implemented by automated machinery, the instruction may be electronically communicated between a main system and onsite machinery 341. In one or more embodiments and as described above, the instruction may include relevant attributes such as what products are to be applied, and irrigation water amounts.

The automated machinery conducts the task according to the instructions received 342. Upon completion of the task, the automated machinery sends a completion code to the main system, and the records are updated to indicate the task as complete 343.

Figure 3I:
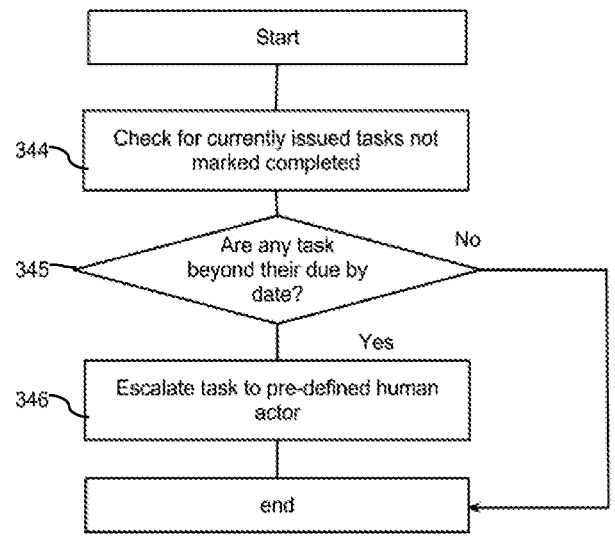
FIG. 3i illustrates a method for confirming the nutrient application tasks are completed according to one embodiment of the invention.

XIII. FIG. 3i

In one or more embodiments, the method of the present invention further comprises a process for confirming that scheduled program tasks are completed in a timely fashion. In one or more embodiments, the process for confirming task completion 307 includes reviewing currently issued tasks not recorded as complete 344, identifying uncompleted tasks that are beyond the scheduled date 345, and issuing an escalation to a predefined human actor or group of human actors 346. This process is generally illustrated in FIG. 3i.

If the completion of all scheduled tasks is confirmed 308, then a harvest yield analysis 309 may be initiated. Thus, the present invention further provides a method for evaluating the results of an automated nutrient application program.

XIV. FIG. 4

Figure 4:
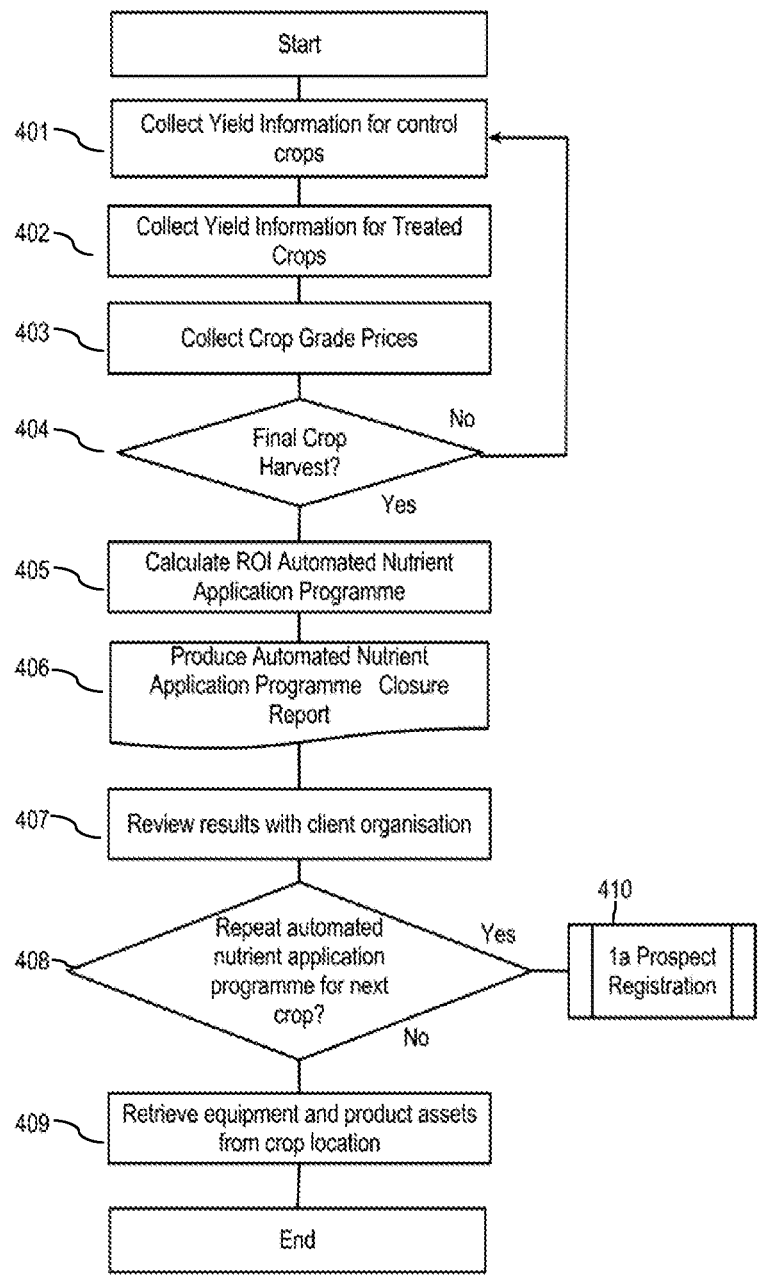
FIG. 4 illustrates a method for evaluating the results of an automated nutrient application program according to one embodiment of the invention.

The method for evaluating the results of an automated program application 309 is generally illustrated in FIG. 4. In one or more embodiments, the method for evaluating the results of an automated nutrient application program includes the steps of collecting crop yield and packout information for each harvest for crops in the client location that have not been part of the automated program application 401, i.e. have been part of a control sample, collecting crop yield and packout information for each harvest of crops in the client location that have been part of the automated nutrient application program 402, collecting information on the market price of each crop grade collected at the time of each harvest 403, calculating a return on investment for each harvest 404, calculating a total return on investment for each crop 405, creating a summary report of return on investment and recommendations 406, reviewing the results with the client 407, and obtaining approval from the client for repeating the automated nutrient application program 408 or if no approval is obtained, retrieving equipment and product stock from the client 409.

In one or more embodiments, when crop yield and packout information is collected, information is gathered for each crop grade. In embodiments where multiple harvests are obtained, information is collected and a return on investment is calculated for each harvest and compiled to obtain a total return on investment for all harvests of each crop.

In one or more embodiments, the return on investment is calculated from the collect costs, yield and pricing information.

In step 408, if the client approves a repeat of the automated nutrient application program for the next crop life cycle, the process starts again 410 with a new prospect registration 10.

Figure 5:
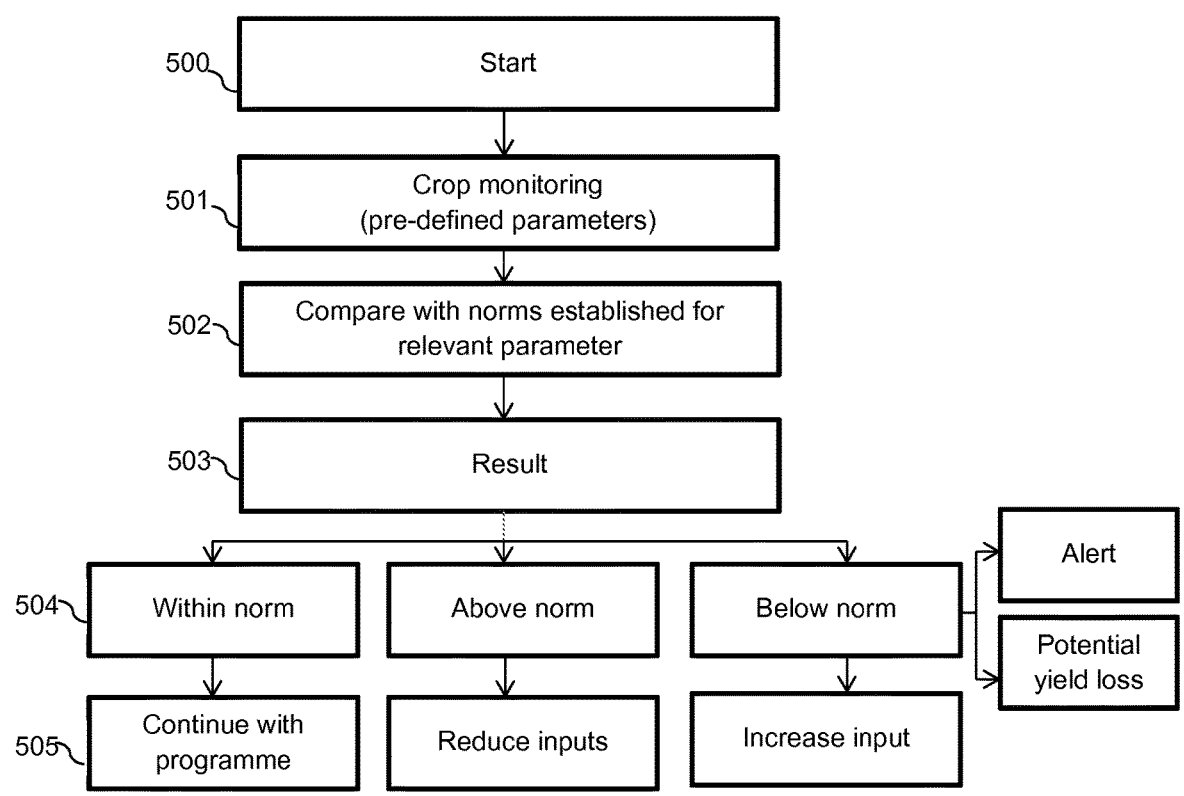
FIG. 5 illustrates a method for amending crop management programs based on monitoring of plant growth.

A method for amending crop management based on monitoring of plant growth is shown in FIG. 5. Using pre-defined parameters, crop monitoring 501 takes place. The data obtained in 501 is compared to a set of norms 502, which may be developed based on previous trials or historical data. Any differential 503 automatically calculated and automatically assessed within predetermined parameters 504 to give the grower direction 505 on a prescribed course of action. For instance, crop monitoring indicates that 'Ground Cover' is at 60% for a given year, whereas the norms indicate that it should be at 80%. The system and method of this embodiment would necessitate an amendment to the crop management program to accelerate growth of the crop.

Figure 6:
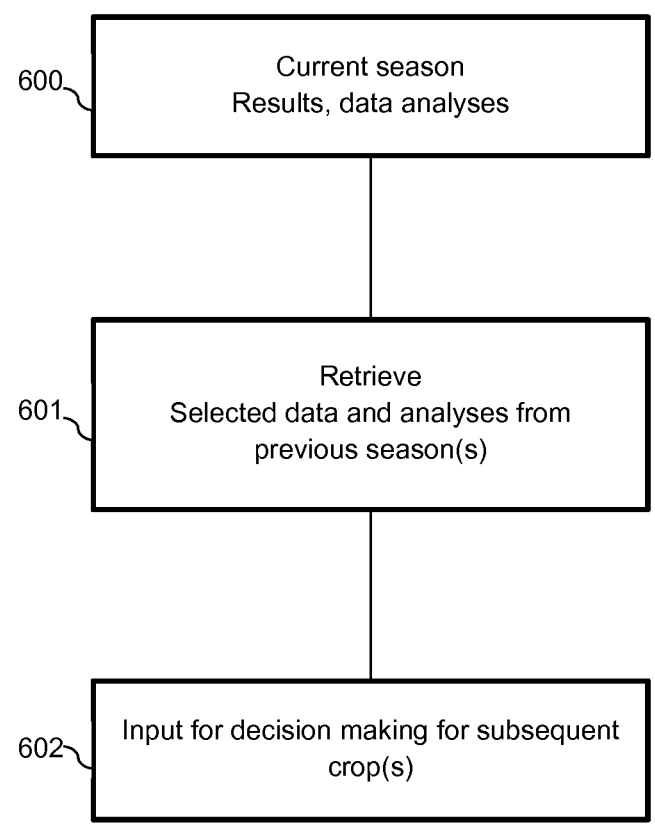
FIG. 6 illustrates a process for retrieval of data from previous/historical sources pertaining to the site/farm location that can then be used for decision making in a current or future season.

A method for making future input decisions based upon retrieval of data from previous/historical sources pertaining to a site/farm location is shown in FIG. 6. Data from a current season 600 may be combined with historical data retrieved from previous seasons 601, and information 602 can be generated, based upon a predetermined set of factors, on input (e.g. nutrient or water) for current or future crops.

For instance, a grower can be informed, from this automated analysis, that past seasons employed 100 lb of nitrogen to get 100 bushels from an acre of corn. A grower can therefore predict, for a subsequent season, that if a yield 120 bushels is desired, inputs of between 110-120 lb of nitrogen would be required, but not less than 100 lb nitrogen.

One or more embodiments of the present invention provides a system and process required for an automated decision making tool for an identified prospect/grower to successfully grow all agricultural, horticultural and food and fiber production enterprises. A grower may conduct a trial and/or adopt a commercial farm input program using an automated management tool for the application of all primary production inputs, not limited to fertilizers and nutrition, but also agricultural chemicals.

Embodiments of the invention provide beneficial methods that include automatically collecting and compiling data related to all relevant factors and generating optimal application recommendations based upon all of these factors would be desirable. One or more methods of the present invention provide automatic scheduling of input application tasks, generation of instructions for implementation of the tasks, and confirmation that the tasks have been completed. Advantageously, the amount of human error is reduced, labor and management costs are reduced, yield is maximized and profitability is maximized.

Various modifications and alterations that do not depart from the scope and spirit of this invention will become apparent to those skilled in the art. This invention is not to be duly limited to the illustrative embodiments set forth herein.

What is claimed is:

1. An automated crop management method, the method comprising:
(i) providing a storage memory and a computer processor in communication with the storage memory, where the storage memory contains one or more stored impact analysis rules;
(ii) collecting, in the storage memory, prospect information, including property characteristics and crop production goals relative to a new prospect;
(iii) collecting, in the storage memory, irrigation information, including irrigation equipment and procedures relative to the new prospect;
(iv) creating, using the processor, a recommended input tasks program that correlates the collected prospect information, and the collected irrigation information, where the recommended input tasks program includes one or more recommended nutrient application tasks, and a schedule for completing said recommended nutrient application tasks, where said schedule includes a lifespan of the crop from nursery and pre-planting through to flowering and harvesting;
(v) preparing to implement the recommended input tasks program;
(vi) implementing said recommended nutrient application tasks, according to said schedule, by electronically communicating an instruction to automated machinery that performs the tasks and then electronically communicates a completion code;
(vii) confirming that all of said recommended nutrient application tasks are completed according to said schedule;
(viii) monitoring weather data and laboratory test results repeatedly, during the lifespan of the crop, where monitoring weather data includes obtaining a weather forecast for a predefined period of time for various weather forecast attributes, and recording a value for each of the weather forecast attributes, where the weather forecast attributes include maximum temperature, minimum temperature, radiation, cloud cover, precipitation, evapotranspiration, and wind speed, where monitoring laboratory test results includes obtaining and recording one or more value indicating a quantity of one or more nutrient present during testing, where the one or more nutrient present during testing comprises at least one of phosphate and potassium;
(ix) identifying nutrient application tasks that are scheduled during the predefined period of time;
(x) accessing the stored impact analysis rules;
(xi) using the stored impact analysis rules to calculate a predicted impact of the weather forecast on the recommended nutrient application tasks scheduled during the predefined period of time;
(xii) identifying nutrient deficiencies that warrant corrective action by comparing the quantity the one or more nutrient present during testing to one or more recommended quantity of the one or more nutrient present during testing; and
(xiii) updating said recommended nutrient application tasks based on the predicted impact of the weather forecast and the identified nutrient deficiencies.

2. The method of claim 1, further comprising identifying the new prospect for an automated agricultural application program, the new prospect having property adapted for agricultural crop production.

3. The method of claim 1, further comprising collecting, in the storage memory, field device data, and updating the recommended input tasks program based upon said field device data.

4. The method of claim 1, further comprising collecting, in the storage memory, agricultural crop input use and production results.

5. The method of claim 1, further comprising generating, by using the processor, a profitability evaluation and analyses of input use.

6. The method of claim 1, wherein the recommended input tasks program includes liquid fertilizer, irrigation and pest control recommendations.

7. The method of claim 3, where said field device data is obtained by monitoring data received from field devices including soil monitors and weather stations on a pre-defined basis.

8. The method of claim 1, where said prospect information includes information about one or more of location of the prospect property, crop information, seedlings, mulching, growth stage, disease, crop pricing, harvest, use of fertilizer, soil type, and use of biological products.

9. The method of claim 8, where said crop information includes information about one or more of crop type, crop variety, crop area, and spacing between and in crop rows.

10. The method of claim 9, where said soil type information includes information about one or more of color, texture, particle size distribution, depth of each soil layer, sodium content and chloride content.

11. The method of claim 1, where said irrigation information includes information about:
   (i) area sprayer infrastructure, including type of sprayer, sprayer volume, spray volume per hectare, and water source;
   (ii) irrigation infrastructure, including irrigation supplier, type of water delivery system, type of nutrient delivery system, type of distribution, flow rate per hour, frequency of application;
   (iii) type of irrigation employed, including whether central pivot, drip, flood, under tree sprinkler or overhead sprinkler irrigation is employed;
   (iv) technical specifications, including fertigation injection system, if any, pressure differential tanks, if any, water pressure, pressure reduction valves, if any, and filtration system, if any;
   (v) scheduling of irrigation, including standard irrigation shifts, maximum shift, and scheduling at difference crop stages; and
   (vi) irrigation monitoring devices, if any.

* * * * *